B. B. BOSWORTH.
COMBINED ROPE COUPLING AND TRAVELER.
APPLICATION FILED OCT. 9, 1916.

1,254,571.

Patented Jan. 22, 1918.

Witnesses.

Inventor.

UNITED STATES PATENT OFFICE.

BIRNEY BOARDMAN BOSWORTH, OF NEW YORK, N. Y.

COMBINED ROPE-COUPLING AND TRAVELER.

1,254,571.  Specification of Letters Patent.  Patented Jan. 22, 1918.

Application filed October 9, 1916. Serial No. 124,681.

*To all whom it may concern:*

Be it known that I, BIRNEY BOARDMAN BOSWORTH, a citizen of the United States, and a resident of the city of New York, borough of Manhattan, in the county and State of New York, have invented a new and Improved Combined Rope-Coupling and Traveler, of which the following is a full, clear, and exact description.

The invention relates to junction points, such as shown and described in the Letters Patent of the United States, for a suspension clothes rack, Serial No. 941,909, granted to me November 30, 1909.

The object of the invention is to provide a new and improved combined rope coupling and traveler arranged to securely fasten the ends of two ropes together side by side, and to provide a traveler or a slide adapted to travel on a guide rod or a similar guiding member with a view to carry the coupled rope ends along with it.

In order to produce the desired result use is made of a rope coupling member and a tubular traveler, the rope coupling member being formed from a single piece of metal pressed around two rope ends arranged one alongside the other, the coupling member being firmly held within the tubular traveler by frictional contact of the side of the coupling member with a portion of the interior surface of the tubular traveler, another portion of the tubular traveler being spaced from the coupling member to provide a longitudinal passage for a guide rod for the traveler to slide on.

A practical embodiment of the invention is represented in the accompanying drawings forming a part of this specification, in which similar characters of reference indicate corresponding parts in both views.

Figure 2:
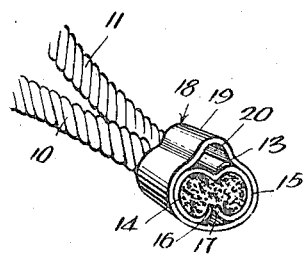
Figure 1:
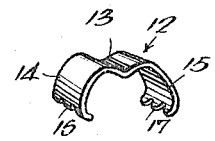

Figure 1 is a perspective view of the rope coupling member in open position; and Fig. 2 is a perspective view of the combined rope coupling and traveler connecting adjacent ends of two ropes with each other. The ends of the ropes 10 and 11 to be coupled together are arranged one alongside the other and the said ends are surrounded by a coupling member 12 made of a single piece of metal formed with a longitudinal crease 13 at the median line of the piece of metal, the sides 14 and 15 of which are bent to segmental shape to permit of pressing the sides around the ends of the ropes 10 and 11 to securely couple the ropes together. The edges of the sides 14 and 15 are preferably provided with teeth 16 and 17 adapted to embed themselves into the material of the rope ends on pressing the coupling member in coupling contact with the rope ends, as plainly shown in Fig. 2. The coupling member 12 extends within a traveler 18 made of a piece of tubing to provide a ferrule, the major portion of which is firmly pressed in contact with the sides 14 and 15 of the coupling member 12 to securely hold the latter in position within the traveler 18. The remaining minor portion 19 of the traveler 18 extends opposite the crease 13 of the coupling member 12, and this portion is somewhat reduced by pressure within a die to provide a longitudinal passage 20 adapted to engage a guide rod for the traveler to slide on, as described in the Letters Patent above referred to.

It will be seen that by the arrangement described no extra fastening means are required for securely holding the coupling member in position on the rope ends or for holding the coupling member 12 securely in position within the traveler 18 and at the same time a passage is provided for a guide rod.

It will be noticed that the device forms a compact unit eminently suited for use as junction points of the supporting cords in the bearings of a suspended clothes rack and for guiding such junction points along their respective guide rods as required in the construction and operation of the suspended clothes rack shown in my previous patent referred to.

Having thus described my invention, I claim as new and desire to secure by Letters Patent:—

1. A combined rope coupling and traveler, comprising a coupling member made of a single piece of metal having a crease lengthwise along the median line, and the said coupling member being adapted to surround and clampingly hold in place two rope ends arranged side by side, the said traveler being in the form of a ferrule within the major portion of which the said coupling member is firmly held by frictional contact, the other portion of the said ferrule being reduced and spaced from the coupling member opposite the crease thereof to provide a passage for a guide rod for the said combined rope coupling and traveler to slide on.

2. A combined rope coupling and traveler, comprising a coupling member made of a single piece of metal having a crease lengthwise along the median line, and the said coupling member being adapted to surround and clampingly hold in place two rope ends arranged side by side, the said traveler being in the form of a ferrule within the major portion of which the said coupling member is firmly held by frictional contact, the other portion of the said ferrule being reduced and spaced from the coupling member opposite the crease thereof to provide a passage for a guide rod for the said combined rope coupling and traveler to slide on.

3. In combination, a plurality of ropes having their ends arranged side by side, a rope coupling and a traveler, the said rope coupling having a coupling member surrounding the said rope ends and firmly fastening the same in place in the coupling member, the said traveler being tubular and clampingly holding the coupling member in position within the said traveler, the latter having a portion spaced from the coupling member to provide a passage for a guide rod for the combined rope clamp and traveler to slide on.

In testimony whereof I have signed my name to this specification in the presence of two subscribing witnesses.

BIRNEY BOARDMAN BOSWORTH.

Witnesses:
HERBERT W. FINKE.
F. H. KNAPP.

Copies of this patent may be obtained for five cents each, by addressing the "Commissioner of Patents, Washington, D. C."